United States Patent [19]
Rhee

[11] Patent Number: 5,765,635
[45] Date of Patent: Jun. 16, 1998

[54] AIR CONDITIONER FOR FORMING AN AIR CURTAIN

[75] Inventor: Harng Rhee, Seoul, Rep. of Korea

[73] Assignee: Daewoo Electronic Co., Ltd., Seoul, Rep. of Korea

[21] Appl. No.: 493,499

[22] Filed: Jun. 22, 1995

[30] Foreign Application Priority Data

Jun. 23, 1994 [KR] Rep. of Korea .............. 94-14462

[51] Int. Cl.$^6$ .............. F25B 79/00; B60H 1/00
[52] U.S. Cl. .............. 165/203; 165/42; 165/43; 454/189; 454/907
[58] Field of Search .............. 165/42, 43, 203; 454/189, 907

[56] References Cited

U.S. PATENT DOCUMENTS

| | | | |
|---|---|---|---|
| 3,127,931 | 4/1964 | Johnson | 454/907 |
| 4,716,957 | 1/1988 | Thompson et al. | 165/217 |
| 4,762,169 | 8/1988 | Andersen et al. | 165/43 |
| 4,881,456 | 11/1989 | Yasuda et al. | 165/43 |
| 5,020,424 | 6/1991 | Iida et al. | 165/43 |
| 5,176,201 | 1/1993 | Yamamoto | 165/43 |
| 5,279,459 | 1/1994 | Single, II | 237/2 A |
| 5,450,894 | 9/1995 | Inoue et al. | 454/907 |

FOREIGN PATENT DOCUMENTS

| | | |
|---|---|---|
| A-0-323196 | 7/1989 | European Pat. Off. . |
| A-0-419722 | 4/1991 | European Pat. Off. . |
| A-0-424879 | 5/1991 | European Pat. Off. . |
| 0481991 | 3/1938 | United Kingdom ......... 454/189 |

*Primary Examiner*—John K. Ford
*Attorney, Agent, or Firm*—Oliff & Berridge, PLC

[57] ABSTRACT

An air conditioner for cooling or heating partitioned zones of an interior of a vehicle includes an air conditioning part and air curtain forming apparatus. The air conditioning part cools and heats intake air. The cooled or heated intake air is supplied to the air curtain forming apparatus. In the air curtain forming apparatus, the cooled or heated air entering the air feeder from the air conditioning part is discharged to an air curtain forming part arranged in plural positions of the interior of the vehicle, and sprayed to form the air curtain by an air spray nozzle part and air suction nozzle part. The sprayed air is admitted to an air-exhaust part to be recirculated to the air feeder or externally discharged. A microprocessor controls the air conditioning part and air curtain forming apparatus by receiving various control signals from a temperature/operation controlling part, a temperature/recognition sensor and a mode selector.

17 Claims, 5 Drawing Sheets

AIR CONDITIONER FOR FORMING AN AIR CURTAIN

BACKGROUND OF THE INVENTION

1. Field of the Invention

The present invention relates to an air conditioner, and more particularly to an air conditioner for cooling and heating a selected zone within a vehicle at a preset temperature.

2. Description of the Prior Art

Generally, a vehicle is equipped with an air conditioner for cooling and heating the internal space thereof at a suitable temperature. For example, U.S. Pat. No. 5,176,201 (issued to Yasushi Yamamoto) discloses an air conditioner for an automobile by means of a manually-operated bypass door. U.S. Pat. No. 5,279,459 describes an air conditioner for an automobile for supplying additionally-heated air to a driver's seat or passengers' seats of the automobile to variably regulate the internal temperature thereof. FIG. 6 is a schematic view showing the conventional air conditioner. Here, the conventional air conditioner 100 includes an air conditioning duct 110 with an air inlet 101 for receiving air. A blower 112 is mounted in air conditioning duct 110 opposite to air inlet 101. An evaporator 114 connected to a refrigeration system (not shown) is arranged on the rear of blower 112. A heater 116 is arranged on the rear of evaporator 114. A plurality of air jet outlets 118 for ejecting the air is provided on the rear of heater 116. A plurality of dampers 120 is mounted to open and close passageways led by blower 112, evaporator 114, heater 116 and respective air jet outlets 118. Air conditioner 110 is further provided with a temperature/operation selector 122 for setting a temperature within a vehicle and outputting a preset temperature signal and an operation condition signal upon the selection of the operational status, such as cooling and heating. In addition, a temperature detection sensor 125 is installed for monitoring the internal temperature of the vehicle to generate a temperature information signal. The preset temperature signal, operation condition signal and temperature information signal are inputted to a microprocessor 130. Microprocessor 130 automatically controls blower 112, evaporator 114, heater 116 and dampers 120 in accordance with the inputted signals. In other words, evaporator 114 or heater 116 is operated by microprocessor 130, and the air supplied from blower 112 is cooled or heated to the preset temperature to be supplied to a louver (not shown) mounted to the front and rear frames of the vehicle via air jet outlets 118, thereby cooling and heating the internal space of the vehicle.

In the conventional air conditioner constructed as above, however, the overall internal space of the vehicle is cooled or heated during the performance of the cooling or heating operation, so that a great deal of time is required before a driver or a passenger feels the preset temperature. Moreover, when the driver solely gets in the vehicle or only a few persons are aboard, cooling or heating the whole internal space of the vehicle results in a significant energy loss.

SUMMARY OF THE INVENTION

It is an object of the present invention to provide an air conditioner for forming an air curtain in a vehicle capable of promptly cooling and heating only a specific zone within the vehicle at a preset temperature to increase the efficiency of the cooling and heating.

To achieve the above object of the present invention, there is provided an air conditioner for forming an air curtain which includes an air conditioning part for drawing in outside air, cooling or heating the drawn air, and discharging the cooled or heated air. The discharged cooled or heated air flows into an air curtain apparatus for spraying the cooled or heated air at plural positions or a specific position in the interior of a vehicle to form the air curtains for performing the cooling or heating operation. Also, a temperature/recognition sensor monitors the temperature of the interior of the vehicle to output a temperature information signal, and monitors the position of a passenger in the interior of the vehicle to output a passenger recognition signal. A mode selector controls the discharge of the cooled or heated air of the air conditioning part, and generates a mode control signal for controlling the spraying position for forming the air curtain in the air curtain forming apparatus. A temperature/operation controlling part outputs an air-amount regulation signal for regulating the amount of the air to flow into the interior of the vehicle, a cooling/heating selection signal for selecting the cooling or heating of the air drawn to the air conditioning part, and a preset temperature signal for setting a cooling temperature or heating temperature of the drawn air. An air-conditioner controlling part receives the temperature information signal and passenger recognition signal of the temperature/recognition sensor, the mode control signal of the mode selector, the air-amount regulation signal, cooling/heating selection signal and preset temperature of the temperature/operation controlling part to control the air conditioning part and air curtain forming apparatus.

According to one embodiment of the present invention, the air conditioning part includes: an air conditioning duct having an air inlet on one end thereof and a plurality of air outlets on the other end thereof for admitting the air from outside, and discharging the admitted air to the air curtain forming apparatus; a first blower arranged to be opposite to the air inlet for drawing in the air from outside; an evaporator arranged on the rear of the first blower for cooling the admitted air during performing the cooling operation; a heater arranged on the rear of the evaporator for heating the admitted air during performing the heating operation; and a plurality of dampers for controlling the air flow in the air conditioning duct, and regulating the amount of the air discharged from the air conditioning duct. The air conditioning duct may include a cool-air outlet between the evaporator and heater, and a warm-air outlet and a plurality of air outlets on the rear of the heater, the cool-air outlet and warm-air outlet respectively being connected to a cool-air intake conduit and a warm-air intake conduit connected to the air curtain forming apparatus, the plurality of air outlets being connected to the interior of the vehicle.

The air curtain forming apparatus may comprise: air feeding part for drawing in the cooled or heated air from the air conditioning part or outside, and discharging the drawn air to a plurality of passageways; an air spray nozzle part for admitting the air discharged from the plurality of passageways via a corresponding plurality of passageways, and spraying the admitted air at the plural positions of the interior of the vehicle to form the air curtain; an air suction nozzle part arranged in the interior of the vehicle to be opposite to the air spray nozzle part, and drawing in the air sprayed from the air spray nozzle part in the air curtain to discharge the air to a plurality of passageways; an air exhausting part for admitting the air discharged from the plurality of passageways of the air suction nozzle part, and recirculating the admitted air to the air feeding part or externally discharging the admitted air; a plurality of first automatic opening/closing parts installed between the plurality of passageways of the air feeding part and the plurality of passageways of the air spray nozzle part for opening or closing the air flow from the air feeding part to the air spray nozzle part for each passageway; and a plurality of second automatic opening/closing parts installed between the plurality of passageways of the air suction nozzle part and the plurality of passageways of the air exhausting part for opening or closing the air flow from the air suction nozzle part to the air exhausting part for each passageway. The air feeding part may be comprised of: an air-supply duct having a first inlet for admitting the air from outside in one end, second and third inlets for admitting the cooled and heated air in one side, a fourth inlet for drawing in the air from the air exhausting part in the other side, and a chamber at the other end thereof, the chamber having a plurality of air branch holes in a side wall thereof; first, second and third dampers for respectively opening and closing the first, second and third inlets; a second blower installed between the first, second, third and fourth inlets and the chamber for drawing in the air; and a plurality of first air branch tubes respectively connected to the plurality of air branch holes of the air-supply duct. Preferably, the air spray nozzle part comprises: a plurality of air branch tubes for forming passageways correspondent to the plurality of first air branch tubes via the plurality of first automatic opening/closing parts; and a plurality of air spray nozzles respectively connected to the plurality of second air branch tubes, and installed to the plural positions of the interior of the vehicle. The plurality of air spray nozzles is respectively arranged over the doors in the interior of the vehicle, between a driver's seat and an assistant driver's seat, between the driver's seat and a rear seat, and between the assistant driver's seat and rear seat. The plurality of air spray nozzles respectively is an elongated hollow body having an opening lengthwisely opened in one side, an air suction hole connected to one of the plurality of second air branch tubes in the central upper portion, and a neck portion lengthwisely provided on a prescribed portion thereof. The air suction nozzle part comprises: a plurality of air suction nozzles arranged to the interior of the vehicle to be opposite to the plurality of air spray nozzles; and a plurality of third air branch tubes respectively connected to the plurality of air suction nozzles for discharging the air drawn from the plurality of air suction nozzles. The plurality of air suction nozzles respectively includes a plurality of air suction holes in the upper portion, and an exhaust hole connected to one of the plurality of air branch tubes in the bottom center portion. The air exhausting part comprises: a discharge duct having a chamber with a side wall including a plurality of air branch holes on one end thereof, and a first exhaust opening for externally discharging the air and a second exhaust opening connected to a circuitous tube for recirculating the air to the air feeding part on the other end thereof; first, second and third dampers for selectively opening and closing the first and second exhaust openings; a third blower installed between the first and second exhaust openings and the chamber for discharging the air; and a plurality of fourth air branch tubes respectively connected to the plurality of second automatic opening/closing parts, and then the plurality of air branch holes of the discharge duct for forming a plurality of passageways.

According to the present invention, a zone to be cooled or heated is set in the internal space of a vehicle, the set zone is separated from the other zones by means of the air curtain, and the preset corresponding zone is cooled or heated by the air conditioner. Therefore, unnecessary cooling or heating of other zones are not required while securing a preset room temperature of the vehicle within a short time. Further, the internal space may be separated into a smoking zone and a non-smoking zone to create a pleasant indoor atmosphere as well as to preserve a passenger's health.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE PREFERRED EMBODIMENT

Figure 1:
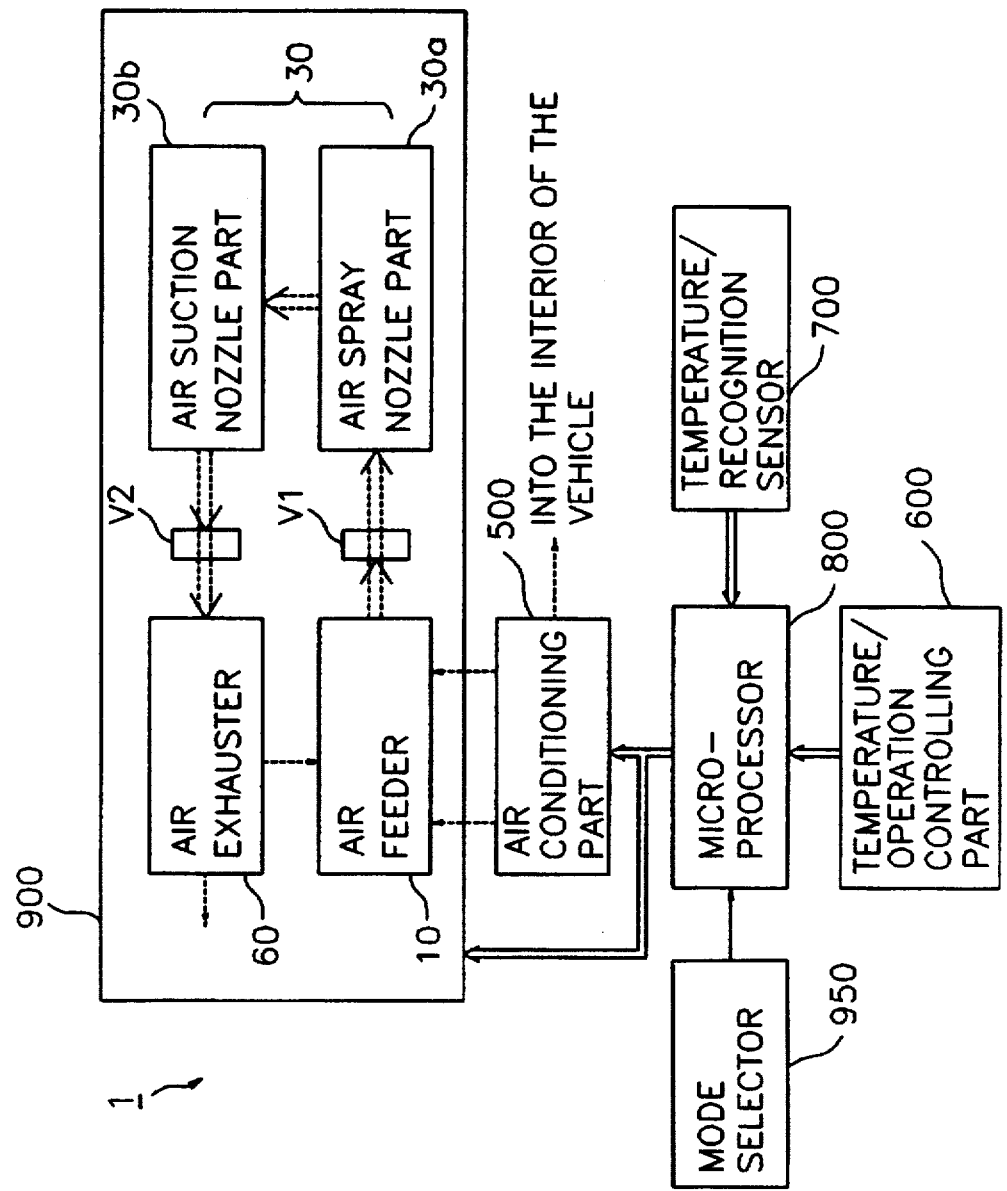
FIG. 1 is a schematic block diagram for showing an air conditioner for forming an air curtain according to one embodiment of the present invention.

Referring to FIG. 1, an air conditioner according to one embodiment of the present invention will be described in detail.

As shown in FIG. 1, an air conditioner 1 for forming the air curtain according to one embodiment of the present invention includes an air conditioning part 500 for drawing in outside air, cooling or heating the drawn air, and discharging the cooled or heated air. The cooled or heated air from air conditioning part 500 flows into an air feeder 10 of an air curtain forming apparatus 900. The cooled or heated air entering air feeder 10 is discharged to an air curtain forming part 30 arranged on plural positions within the interior of a vehicle. The discharged air is ejected to form an air curtain by means of an air spray nozzle part 30a and air suction nozzle part 30b. The ejected air is admitted to an air exhauster 60, which is then circulated again to air feeder 10 or externally expelled. A microprocessor 800 receives various control signals from a temperature/operation controlling part 600, a temperature recognition sensor 700 and a mode selector 950 to control air conditioning part 500 and air curtain forming apparatus 900.

Reference numerals V1 and V2 denote first and second automatic opening/closing valves, respectively. Solid-lined arrows designate flows of electric signals, and dotted-lined arrows designate air flows in air conditioner 1.

Figure 2:
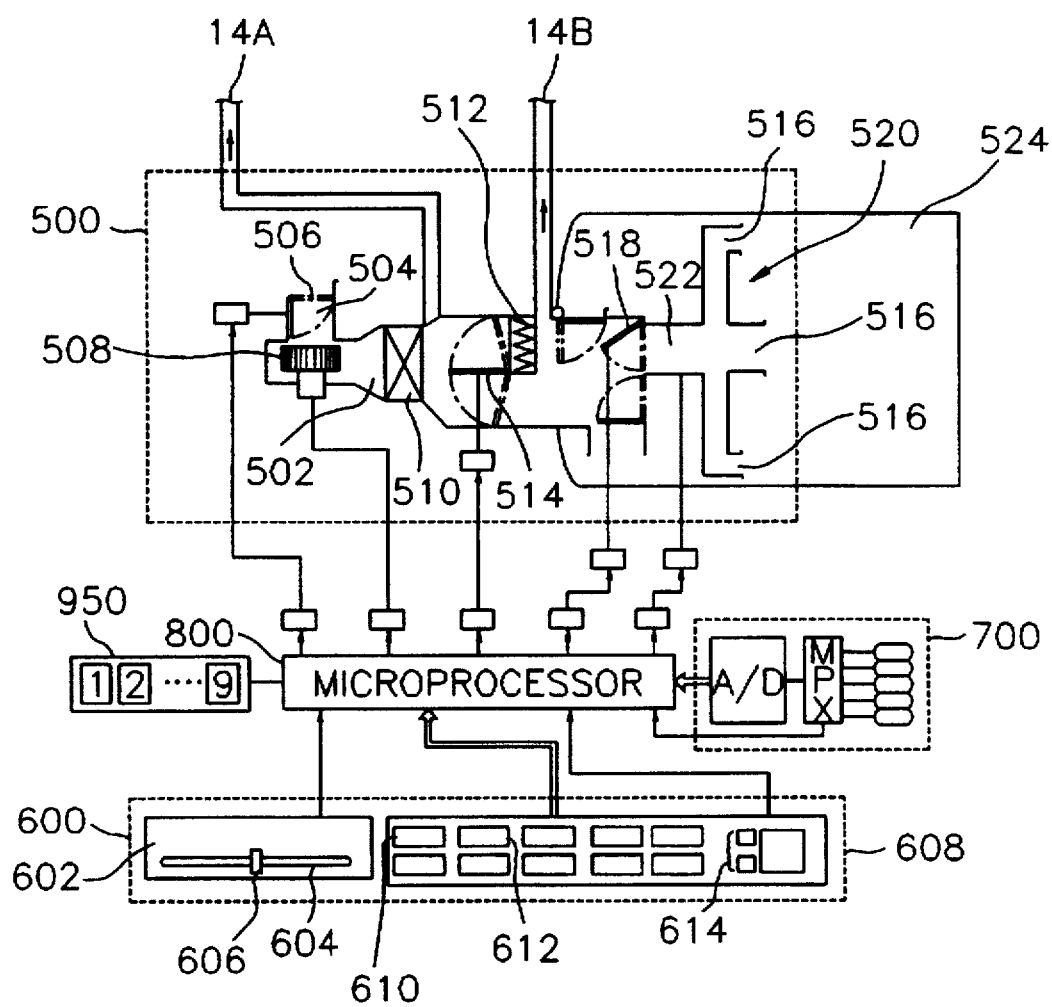
FIG. 2 is a view for showing the mutual connections of an air conditioning part, an temperature/recognition sensor, a mode selector, a temperature/operation controlling part and an air-conditioner controlling part of FIG. 1.

FIG. 2 illustrates the mutual connection of air conditioning part 500, temperature/recognition sensor 700, mode selector 950, temperature/operation controlling part 600 and microprocessor 800 which is an air-conditioner controlling part. As shown in FIG. 2, air conditioning part 500 has an air conditioning duct 502 for guiding air flow when drawing in and discharging the air. Air conditioning duct 502 includes an air inlet 504, and an air ejecting portion 520 one end of which has one air outlet 522 and the other end of which has a plurality of air outlets 516. The outside air is admitted via air inlet 504 of air conditioning duct 502. A pivotally operating damper 506 is installed to air inlet 504 to open or close air inlet 504, thereby admitting or blocking the air inflow from air inlet 504. A blower 508 is mounted within air conditioning duct 502 to be opposite to air inlet 504. Once blower 508 begins to operate when outside air inlet 504 is open, the outside air is drawn to the inside of air conditioning duct 502 by means of blower 508. An evaporator 510 connected to a refrigeration system (not shown) is disposed on the rear of blower 508. The drawn air passes through evaporator 510. The air drawn while operating evaporator 510 is cooled through evaporator 510, whereas the drawn air, while evaporator 510 is not operated, is not cooled through evaporator 510. A heater 512 is placed on the rear of evaporator 510, and a damper 514 is pivotally installed to one side of heater 512. The drawn air selectively passes through a path with or without heater 512 by the operation of damper 514. When the air cooled by evaporator 510 flows, damper 514 blocks the flow of the cooled air into heater 512. Therefore, the cooled air flows in the rear direction without passing through heater 512. When the drawn air is heated, heater 512 is operated while evaporator 510 is not operated. Accordingly, the drawn air passes through evaporator 510 intact, and passes through heater 512 by the operation of damper 514 to be heated by heater 512. Air outlet 522 of air conditioning duct 502 is disposed on the rear of heater 512. A pivotally-swinging damper 518 is installed to air outlet 522, which opens or closes air outlet 522 by the pivotal swinging to discharge cooled or heated air or block the air discharge. The air discharged via air outlet 522 flows into the interior 524 of the vehicle via a plurality of air outlets 516. The air entering via air inlet 504 may be discharged to interior 524 of the vehicle via a plurality of air outlets 516 without being cooled or heated. Additionally, air conditioning duct 502 is provided with a cool-air intake conduit 14a and a warm-air intake conduit 14b. Cool-air intake conduit 14a is connected between evaporator 510 and heater 512, and warm-air intake conduit 14b is between heater 512 and air outlet 522.

Air conditioner 1 for forming the air curtain according to the present invention includes temperature/operation controlling part 600 for controlling a desired temperature to be maintained in the interior of the vehicle and an operational state such as cooling and heating. Here, temperature/operation controlling part 600 may be a typical controller for the air conditioner. Temperature/operation controlling part 600 outputs to microprocessor 800 a temperature setting signal and an operation setting signal generated in accordance with inputs of the desired temperature and operational state of cooling and heating. Also, air conditioner 1 for forming the air curtain according to the present invention includes temperature/recognition sensor 700 for outputting a temperature information signal by monitoring the temperature of interior 524 of the vehicle, and a passenger recognition signal by monitoring the position of a passenger within the vehicle. The temperature information signal and passenger recognition signal from temperature/recognition sensor 700 are supplied to microprocessor 800.

Temperature/operation controlling part 600 includes an air amount regulator 602 for regulating the amount of air entering interior 524 of the vehicle. A knob 606 of air amount regulator 602 moves right to left or vice versa along a slit 604. An electric signal is generated by this movement of knob 606, which is in turn supplied to microprocessor 800. Furthermore, temperature/operation controlling part 600 has a temperature/operation controller 608 for controlling the cooling and heating operation for interior 524 of the vehicle. Temperature/operation controller 608 includes an automatic-control input button 610, a cooling/heating selection button 612 and a temperature setting button 614.

The input button types of temperature/operation controller 608 may be identical to those of the typical temperature/operation controller. Microprocessor 800 is connected to mode selector 950 which has nine mode buttons from mode 1 to mode 9. When a mode button of mode selector 950 is selected, mode selector 950 generates a corresponding electric signal. The generated electric signal is received into microprocessor 800 which controls air conditioner 1 in accordance with the received electric signal.

Figure 3:
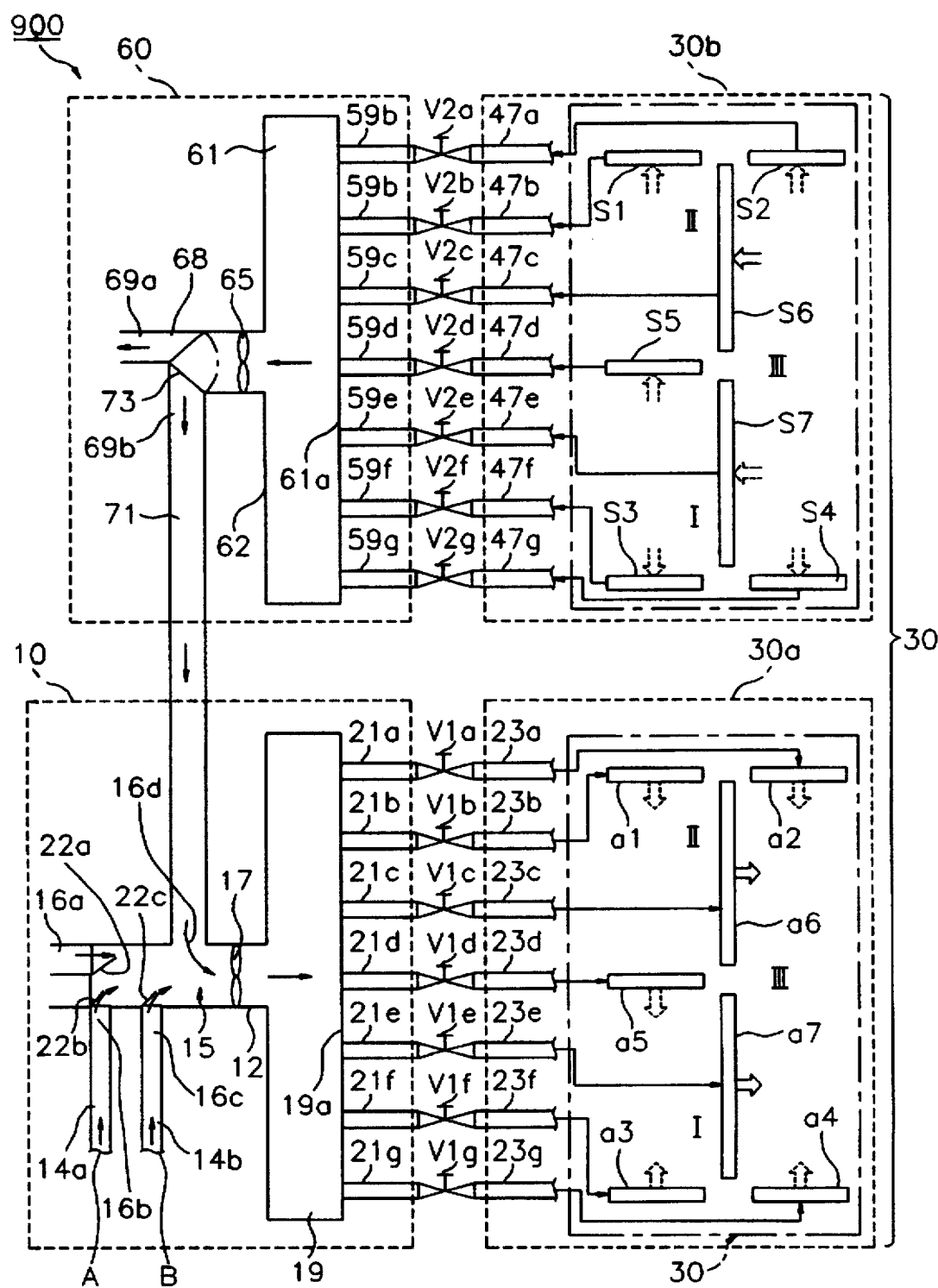
FIG. 3 is a detailed view for showing an air curtain forming apparatus of FIG. 1.

FIG. 3 is a detailed view of the air curtain forming apparatus of the air conditioner shown in FIG. 1.

Air curtain forming apparatus 900 has air feeder 10 for admitting outside air, cool air or warm air to be discharged into interior 524 of the vehicle. A reference numeral 12 denotes an air-supply duct of air feeder 10. On one side of air-supply duct 12, a second inlet 16b and a third inlet 16c respectively connected to cool-air intake conduit 14a and warm-air intake conduit 14b of air conditioning part 500 are formed. Thus, the cool air and warm air in air conditioning part 500 are admitted to air-supply duct 12 via cool-air intake conduit 14a and warm-air intake conduit 14b. One end of air-supply duct 12 is provided with a first inlet 16a capable of admitting the outside air. First, second and third dampers 22a, 22b and 22c pivotally swing about first, second and third inlets 16a, 16b and 16c to open or close them, respectively. On the other side of air-supply duct 12, a fourth inlet 16d for receiving the air discharged from an air exhauster 60, which will be described later, is formed. Other end of air-supply duct 12 has a chamber 19 of a prescribed size. A first blower 17, e.g., a blower motor, is mounted between first to fourth inlets 16a, 16b, 16c and 16d and chamber 19. A plurality of first air branch tubes 21a, 21b, 21c, 21d, 21e, 21f and 21g is connected to a side wall 19a of chamber 19. Consequently, the intake air entering from first to fourth inlets 16a to 16d is discharged to a plurality of first air branch tubes 21a, 21b, 21c, 21d, 21e, 21f and 21g via first blower 17. The plurality of first air branch tubes 21a, 21b, 21c, 21d, 21e, 21f and 21g is connected to automatic opening/closing valves V1a, V1b, V1c, V1d, V1e, V1f and V1g, respectively.

Also, air curtain forming apparatus 900 has an air exhauster 60 provided with a discharge duct 62 for admitting the air and discharging the admitted air. A chamber 61 of a prescribed size is formed to one end of discharge duct 62. A side wall 61a of chamber 61 is connected to a plurality of second air branch tubes 59a, 59b, 59c, 59d, 59e, 59f and 59g through which the air is admitted into chamber 61. On the other end of discharge duct 62, a first exhaust opening 69a for directly discharging the intake air, and a second exhaust opening 69b for supplying the intake air again to air feeder 10 are provided. The air discharged via second exhaust opening 69b of discharge duct 62 flows into fourth inlet 16d of air-supply duct 12 via a circuitous tube 71. A damper 73 is installed within discharge duct 62 which selectively opens and closes first exhaust opening 69a and second exhaust opening 69b. A second blower 65, e.g., a blower motor, is provided between chamber 61 and first and second exhaust openings 69a and 69b. The plurality of second air branch tubes 59a, 59b, 59c, 59d, 59e, 59f and 59g is respectively connected to a plurality of automatic opening/closing valves V2a, V2b, V2c, V2d, V2e, V2f and V2g.

Figure 4:
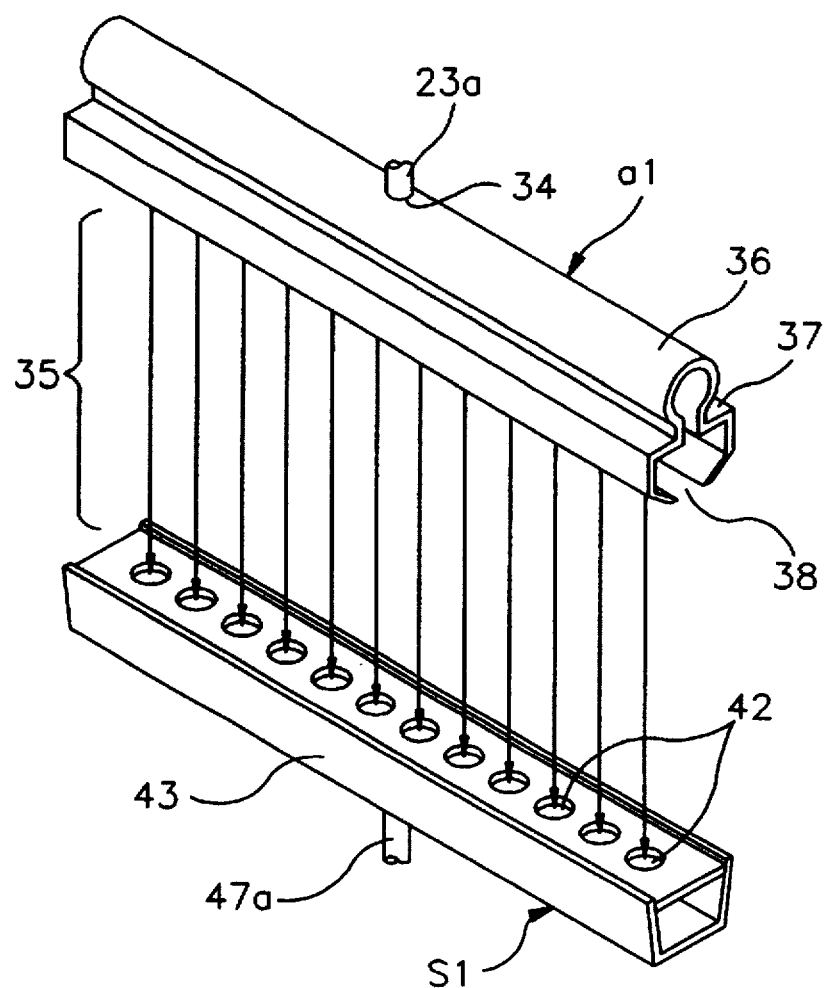
FIG. 4 is a view for explaining the formation of an air curtain by an air spray nozzle and an air suction nozzle.
Figure 5:
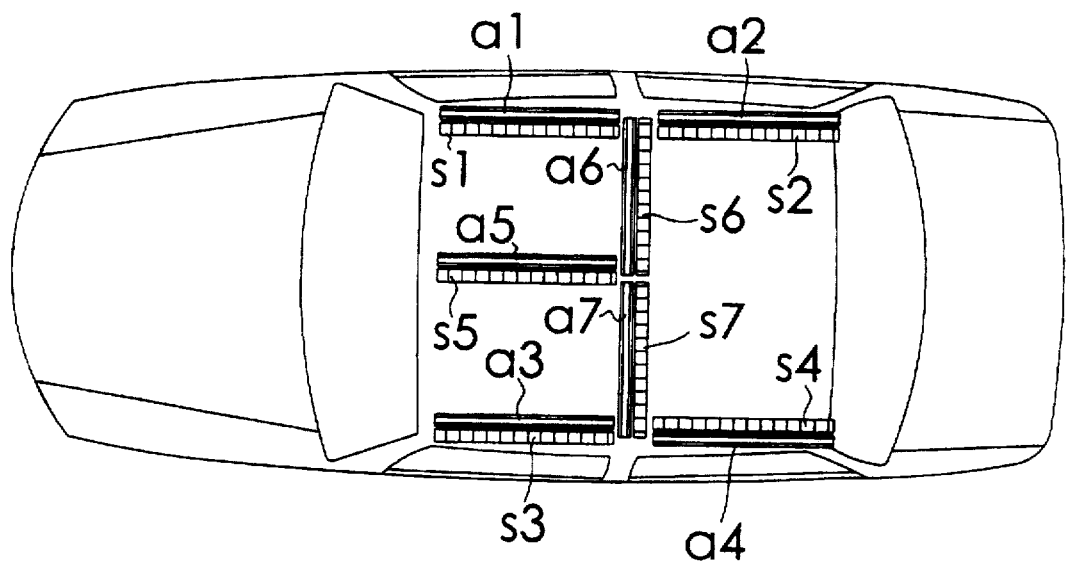
FIG. 5 is a view for showing one embodiment of partitioning the interior of a vehicle into a plurality of zones.
Figure 6:
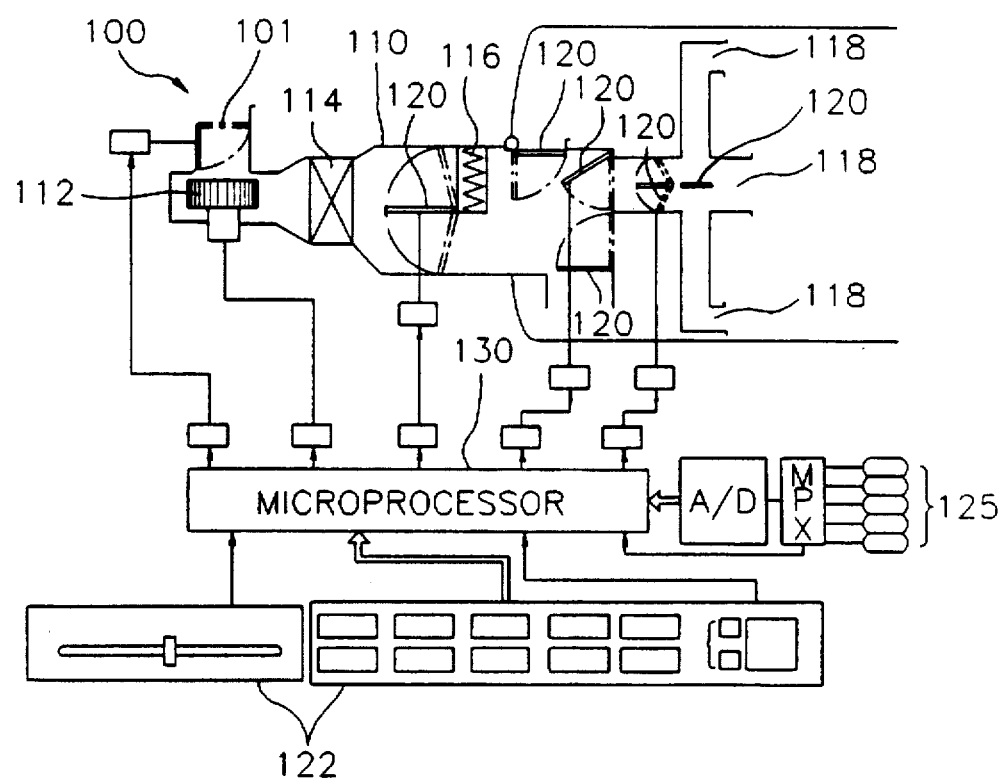
FIG. 6 is a view for schematically showing a conventional air conditioner.

Air curtain forming apparatus 900 has an air curtain forming part 30. FIG. 4 is a view for explaining the formation of the air curtain by the air spray nozzle and the air suction nozzle, and FIG. 5 shows one embodiment of partitioning interior 524 of the vehicle into a plurality of zones. Air curtain forming part 30 is formed of air spray nozzle part 30a and air suction nozzle part 30b. Air spray nozzle part 30a is provided with a plurality of third air branch tubes 23a, 23b, 23c, 23d, 23e, 23f and 23g respectively connected to a plurality of first air branch tubes 21a, 21b, 21c, 21d, 21e, 21f and 21g via a plurality of automatic opening/closing valves V1a, V1b, V1c, V1d, V1e, V1f and V1g. The air discharged from first air branch tubes 21a, 21b, 21c, 21d, 21e, 21f and 21g is respectively admitted into third air branch tubes 23a, 23b, 23c, 23d, 23e, 23f and 23g via automatic opening/closing valves V1a, V1b, V1c, V1d, V1e, V1f and V1g. The admitted air flows into a plurality of air spray nozzles a1, a2, a3, a4, a5, a6 and a7. FIG. 4 shows the connection of a single third air branch tube 23a and a single air spray nozzle a1. Such a connection is applied to other third air branch tubes 23b, 23c, 23d, 23e, 23f and 23g and other air spray nozzles a2, a3, a4, a5, a6 and a7. Respective air spray nozzles a1, a2, a3, a4, a5, a6 and a7 have the same construction. As shown in FIG. 4, air spray nozzle a1 is an elongated hollow body 36 of which one side is open in a lengthwise direction to form an opening 38. An air suction hole 34 connected to third air branch tube 23a is formed in the upper center of body 36. A predetermined portion of body 36 has a neck portion 37 to narrow the width of the hollow. Therefore, the air entering air suction hole 34 is discharged from long opening 38 to form air curtain 35. Such an air spray nozzle is disposed over respective doors (four doors in this embodiment) of the vehicle.

Reference numerals a1, a2, a3 and a4 denote the air spray nozzles arranged over the respective doors. Reference numerals a5, a6 and a7 respectively denote the air spray nozzles disposed between a driver's seat I and an assistant driver's seat II, between assistant driver's seat II and a rear seat III, and between driver's seat I and rear seat III. Thus, interior 524 of the vehicle can be partitioned into the zones of driver's seat I, assistant driver's seat II and rear seat III by means of air spray nozzles a1, a2, a3 and a4 on the door sides and central air spray nozzles a5, a6, and a7.

On the other hand, the air discharged in the shape of the air curtain from air spray nozzles a1, a2, a3, a4, a5, a6 and a7 is drawn by air suction nozzle part 30b which has a plurality of air suction nozzles s1, s2, s3, s4, s5, s6 and s7. As shown in FIG. 4, the air discharged in the shape of the air curtain is drawn by air suction nozzle s1. reference numerals s2, s3, s4, s5, s6 and s7 denote the air suction nozzles installed on the bottom of interior 524 of the vehicle, correspondent to respective air spray nozzles a2, a3, a4, a5, a6 and a7. Respective air suction nozzles s1, s2, s3, s4, s5, s6 and s7 have the same construction. Air suction nozzle s1 has a hollowed body 43 having a plurality of suction holes 42 in the upper portion thereof. An exhaust hole (not shown but identical to air suction hole 34 of the air spray nozzle) is formed in the bottom center of body 43. The exhaust hole of body 43 is coupled with a fourth air branch tube 47a, which will be described later. Accordingly, the air is discharged to fourth air branch tube 47a via the exhaust hole of air suction nozzle s1. Reference numerals 47a, 47b, 47c, 47d, 47e, 47f and 47g denote the fourth air branch tubes which are coupled to respectively corresponding air suction nozzles s1, s2, s3, s4, s5, s6 and s7. Respective fourth air branch tubes 47a, 47b, 47c, 47d, 47e, 47f and 47g are correspondingly connected to respective automatic opening/closing valves V1a, V1b, V1c, V1d, V1e, V1f and V1g. Therefore, the air discharged from fourth air branch tubes 47a, 47b, 47c, 47d, 47e, 47f and 47g is admitted to air exhauster 60 via automatic opening/closing valves V1a, V1b, V1c, V1d, V1e, V1f and V1g and second air branch tubes 59a, 59b, 59c, 59d, 59e, 59f and 59g.

Hereinafter, the operations of the air conditioner according to the present invention will be described.

Air conditioner 1 for forming the air curtain according to the present invention enables the operation of air conditioning part 500 only. To operate air conditioning part 500 alone, the button of mode 8 of mode selector 950 is selected. By the selection of mode 8, mode selector 950 outputs a mode-8 electric signal corresponding thereto, and the mode-8 electric signal is received into microprocessor 800. Upon receipt of the mode-8 electric signal, microprocessor 800 operates dampers 22b and 22c of air feeder 10 to close second inlet 16b and third inlet 16c. Consequently, the air entering via air inlet 504 of air conditioning part 500 is not admitted to air feeder 10 of air curtain forming apparatus 900. Temperature set button 614 of temperature/operation controller 608 is manipulated to set the temperature of interior 524 of the vehicle. If automatic control button 610 is selected after setting the temperature, microprocessor 800 recognizes the selection of automatic control button 610. By doing so, microprocessor 800 operates blower 508 of air conditioning part 500 to draw in the outside air (in case the outside air is drawn by selecting unshown button). In addition, microprocessor 800 operates evaporator 510 or heater 512 in accordance with the temperature of interior 524 of the vehicle to cool or heat the drawn air. The cooled or heated air is discharged to interior 524 of the vehicle via air outlets 516 of air conditioning part 500. Temperature/recognition sensor 700 installed in interior 524 of the vehicle continuously monitors the temperature of interior 524 of the vehicle to notify the temperature to microprocessor 800. Then, microprocessor 800 that monitors the temperature of interior 524 of the vehicle operates evaporator 510 or heater 512 and continuously cools or heats the air until the temperature of interior 524 of the vehicle reaches the preset temperature. Thus, the air of interior 524 of the vehicle is automatically cooled or heated up to the preset temperature by the selection of automatic control button 610. When cooling/heating selection button 612 is selected after setting the temperature, microprocessor 800 recognizes the selection of cooling/heating selection button 612. By this operation, microprocessor 800 recognizes blower 508 of air conditioning part 500 to force the outside air to be drawn. At this time, if a cooling operation button (not shown) is selected, microprocessor 800 recognizes the selection of the cooling operation button to operate evaporator 510 of air conditioning part 500, thereby cooling the drawn air. The cooled air is discharged to interior 524 of the vehicle via air outlet 516 of air conditioning part 500. As described above, temperature/recognition sensor 700 installed in interior 524 of the vehicle continuously monitors the temperature of interior 524 of the vehicle to inform microprocessor 800 of the temperature of interior 524 of the vehicle. Microprocessor 800 that monitors the temperature of interior 524 of the vehicle operates evaporator 510 cools the air of interior 524 of the vehicle until the temperature of interior 524 of the vehicle reaches the preset temperature. Therefore, the air of interior 524 of the vehicle is cooled down to the preset temperature by the selection of cooling/heating selection button 612 and the cooling operation button.

Meanwhile, if the cooling operation button is not selected, microprocessor 800 operates heater 512 of air conditioning part 500 to heat the drawn air. The heated air is discharged to interior 524 of the vehicle via air outlet 516 of air conditioning part 500. Also, temperature/recognition sensor 700 installed in interior 524 of the vehicle continuously monitors the temperature of interior 524 of the vehicle to inform microprocessor 800 of the temperature of interior 524 of the vehicle. Microprocessor 800 that monitors interior 524 of the vehicle operates heater 512 heats the air of interior 524 of the vehicle until the temperature of interior 524 of the vehicle reaches the preset temperature.

The amount of the air to be discharged to interior 524 of the vehicle is regulated by handling knob 606 of air amount regulator 602, right to left or vice versa. While all dampers installed to air conditioning part 500 are not illustrated in detail in FIG. 1, for example, the right to left movement of knob 606 swings damper 518. By the swinging of damper 518, the amount of the air discharged to air outlet 516 is controlled.

In air conditioner 1, for forming the air curtain according to the present invention as described above, when interior 524 of the vehicle is cooled or heated by the operation of air conditioning part 500 only, air conditioning part 500 may be controlled in the same way as the conventional air conditioner.

FIG. 5 illustrates interior 524 of the vehicle partitioned into the plurality of zones. Reference symbols I, II and III respectively denote the driver's seat zone, assistant driver's seat zone and rear seat zone. When driver's seat zone I is exclusively cooled or heated by the air conditioner for forming the air curtain according to the present invention, the button of mode 1 of mode selector 950 is selected. By selection of mode 1, mode selector 950 supplies a mode-1 electric signal to microprocessor 800 which in turn operates first blower 17 of air feeder 10 and second blower 65 of air exhauster 60 in air curtain forming apparatus 900. When interior 524 of the vehicle is cooled, microprocessor 800 opens second inlet 16b, and closes first and third inlets 16a and 16c and air outlet 522 by dampers 22a and 22c and damper 518, respectively. Then, the air cooled by evaporator 510 of air conditioning part 500 is admitted to air feeder 10 via cool-air intake conduit 14a. Simultaneously, microprocessor 800 opens just automatic opening/closing valves V1d, V1e and V1g connected to central air spray nozzles a5 and a7 and air spray nozzle a3 at the door side, and automatic opening/closing valves V2d, V2e and V2g connected to central air suction nozzles s5 and s7 and air suction nozzle s3 at the door side. By doing so, the cooled air entering air feeder 10 is discharged to air spray nozzles a3, a5 and a7 via first air branch tubes 21d, 21e and 21g, automatic opening/closing valves V1d, V1e and V1g and third air branch tubes 23d, 23e and 23g. Since the air entering air spray nozzles a3, a5 and a7 is discharged to air suction nozzles s3, s5 and s7 while forming the air curtain, driver's seat zone I is separated from assistant driver's seat zone II and rear seat zone III. The air entering air suction nozzles s3, s5 and s7 is admitted to air exhauster 60 via fourth air branch tubes 47d, 47e and 47g, automatic opening/closing valves V2d, V2e and V2g and second air branch tubes 59d, 59e and 59g. When microprocessor 800 swings damper 73 installed on the rear of second blower 65 to close first exhaust opening 69a and open second exhaust opening 69b, the air of air exhauster 60 is admitted to air feeder 10 via circuitous tube 71. At this time, the consumed amount of the cool air supplied via second inlet 16b of air feeder 10 can be minimized. As described above, when the air curtain is formed around driver's seat zone I, assistant driver's seat zone II and rear seat zone II are separated from driver's seat zone I by the air curtain to effectively and instantly cool driver's seat zone I.

On the other hand, when heating interior 524 of the vehicle, microprocessor 800 closes first inlet 16a, second inlet 16b and air outlet 522 by means of damper 22a, damper 22b and damper 518, respectively while opening third inlet 16c. Accordingly, the air heated by heater 512 of air conditioning part 500 is admitted to air feeder 10 via warm-air intake conduit 14b. The heated air entering air feeder 10 circulates within air conditioner 1 to heat driver's seat zone I under the above-stated control of microprocessor 800.

The following <Table> represents the air spray nozzles and air suction nozzles under the operative or inoperative state in view of a mode selected by mode selector 950. The operation of automatic opening/closing valves V1a, V1b, V1c, V1d, V1e, V1f and V1g and operation of dampers 16a, 16b, 16c, 518 and 73 in accordance with the foregoing operation will be apparently understood by the above description and drawings.

TABLE

| Mode | Cooling/ heating zone | under operative state | | under inoperative state | |
|---|---|---|---|---|---|
| | | air spray nozzle | air suction nozzle | air spray nozzle | air suction nozzle |
| 1 | driver's seat (I) | a3, a5, a7 | s3, s5, s7 | a1, a2, a4, a6 | s1, s2, s4, s6 |
| 2 | assistant driver's seat (II) | a1, a5, a6 | s1, s5, s6 | a2, a3, a4, a7 | s2, s3, s4, s7 |
| 3 | rear seat (III) | a2, a4, a6, a7 | s2, s4, s6, s7 | a1, a3, a5 | s1, s3, s5 |
| 4 | I and II | a1, a3, a6, a7 | s1, s3, s6, s7 | a2, a4, a5 | s2, s4, s5 |
| 5 | I and III | a2, a3, a4, a5, a6 | s2, s3, s4, s5, s6 | a1, a7 | s1, s7 |
| 6 | II and III | a1, a2, a4, a5, a7 | s1, s2, s4, s5, s7 | a3, a6 | s3, s6 |
| 7 | I, II and III | a1, a2, a3, a4, a5 | s1, s2, s3, s4 | a5, a6, a7 | s5, s6, s7 |
| 8 | Only Air-conditioning part | | | | |
| 9 | Automatic selection | | | | |

In the above <Table>, modes 2, 3, 6 and 7 may be more effective in blocking the spreading of cigarette smoke nearby as well as in performing the cooling and heating restricted in the corresponding zone. Especially, mode 7 can give the effect of blocking the entry of outside air while opening of the door of the vehicle.

The automatic selection of the mode 9 is carried out as follows. More specifically, upon the selection of the button of the mode 9 in mode selector 950, temperature/recognition sensor 700 monitors the corresponding zone of the passengers together with the temperature information signal and provides the passenger recognition signal to microprocessor 800. The passenger is recognized by sensing the weight, infrared rays or the amount of oxygen. Microprocessor 800 that receives the passenger recognition signal executes the operation from mode 1 to mode 7 of <Table>.

In the above embodiment, although air conditioner 1 according to the present invention is furnished with air spray nozzles a1, a2, a3, a4, a5, a6 and a7 and air suction nozzles s1, s2, s3, s4, s5, s6 and s7 respectively number seven, the present invention is not defined thereto but includes all air conditioner and air conditioning methods in which an air curtain is formed within the interior of a vehicle to set a certain zone.

Meantime, when the interior of the vehicle is not cooled or heated as in spring and summer, the outside air is forcibly admitted via first inlet 16a to form the air curtain at a certain zone. Then, the zone is established as a smoking zone, and the other zones are determined as no-smoking zones. At this time, the cigarette smoke cannot pass through the air curtain in the case of smoking in the prescribed zone partitioned by the air curtain, so that the cigarette smoke remains in the smoking zone to permit the other zones to be affected by only a slight amount of the smoke, thereby preserving a non-smoker's health and relieving an unpleasant atmosphere.

In an air conditioner for forming an air curtain according to the present invention as described above, a zone to be cooled or heated is set in the internal space of a vehicle, the set zone is separated from the other zones by means of the air curtain, and the preset corresponding zone is cooled or heated by the air conditioner. Therefore, unnecessary cooling or heating of other zones are not required while securing a preset room temperature of the vehicle within a short time. Furthermore, there is an additional effect that the internal space is separated into a smoking zone and a non-smoking zone to create a pleasant indoor atmosphere as well as to preserve passenger health.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An air conditioner for forming an air curtain comprising:
    an air conditioning part for drawing in outside air, cooling or heating the drawn air, and discharging the cooled or heated air;
    an air curtain forming apparatus for admitting said cooled or heated air discharged from said air conditioning part, and spraying said cooled or heated air at plural positions or a specific position of an interior of a vehicle to form said air curtain for performing the cooling or heating operation,
    said air curtain forming apparatus having
        an air feeding part for drawing in said cooled or heated air from said air conditioning part or outside, and discharging said drawn air to a plurality of passageways,
        said air feeding part having
            an air-supply duct having a first inlet for admitting said air from outside in one end, second and third inlets for admitting said cooled and heated air in one side, a fourth inlet for drawing in said air from said air exhausting part in the other side, and a chamber at the other end thereof, said chamber having a plurality of air branch holes in a side wall thereof;
            first, second and third dampers for respectively opening and closing said first, second and third inlets;
            a blower installed between said first, second, third and fourth inlets and said chamber for drawing in said air;
            a plurality of first air branch tubes respectively connected to said plurality of air branch holes of said air-supply duct;
        an air spray nozzle part for admitting said air discharged from said plurality of passageways via a corresponding plurality of passageways, and spraying said admitted air at said plural positions of said interior of said vehicle to form said air curtain;
    an air suction nozzle part arranged in said interior of said vehicle opposite to said air spray nozzle part, and drawing in said air sprayed from said air spray nozzle part in said air curtain to discharge said air to a plurality of passageways;
    an air exhausting part for admitting said air discharged from said plurality of passageways of said air suction nozzle part, and recirculating said admitted air to said air feeding part or externally discharging said admitted air;
    a plurality of first automatic opening/closing parts installed between said plurality of passageways of said air feeding part and said plurality of passageways of said air spray nozzle part for opening or closing the air flow from said air feeding part to said air spray nozzle part for each passageway;
    a plurality of second automatic opening/closing parts installed between said plurality of passageways of said air suction nozzle part and said plurality of passageways of said air exhausting part for opening or closing the air flow from said air suction nozzle part to said air exhausting part for each passageway;
    a temperature/recognition sensing part for monitoring a temperature of said interior of said vehicle to output a temperature information signal, and monitoring the position of a passenger in said interior of said vehicle to output a passenger recognition signal;
    a mode selecting part for controlling the discharge of said cooled or heated air of said air conditioning part, and controlling the spraying position of said air curtain of said air curtain forming apparatus;
    a temperature/operation controlling part for outputting an air-amount regulation signal for regulating the amount of the air admitted to said interior of said vehicle, a cooling/heating selection signal for selecting the cooling or heating of said air drawn to said air conditioning part, and a preset temperature signal for setting a cooling temperature or heating temperature of said drawn air; and
    an air-conditioner controlling part for receiving said temperature information signal and passenger recognition signal of said temperature/recognition sensing part, said mode control signal of said mode selecting part, said air-amount regulation signal, cooling/heating selection signal and preset temperature signal of said temperature/operation controlling part to control said air conditioning part and air curtain forming apparatus.

2. The air conditioner for forming an air curtain as claimed in claim 1, wherein said air conditioning part comprises:
    an air conditioning duct having an air inlet on one end thereof and a plurality of air outlets on the other end thereof for admitting the air from outside, and discharging said admitted air to said air curtain forming apparatus;
    a first blower arranged to be opposite to said air inlet for drawing in said air from outside;
    an evaporator arranged on the rear of said first blower for cooling said admitted air during performing said cooling operation;
    a heater arranged on the rear of said evaporator for heating said admitted air during performing said heating operation; and
    a plurality of dampers for controlling the air flow in said air conditioning duct, and regulating the amount of said air discharged from said air conditioning duct.

3. The air conditioner for forming an air curtain as claimed in claim 2, wherein said air conditioning duct includes a cool-air outlet between said evaporator and heater, and a warm-air outlet and a plurality of air outlets on the rear of said heater, said cool-air outlet and warm-air outlet respectively being connected to a cool-air intake conduit and a warm-air intake conduit connected to said air curtain forming apparatus, said plurality of air outlets being connected to said interior of said vehicle.

4. The air conditioner for forming an air curtain as claimed in claim 1, wherein said air spray nozzle part comprises:
   a plurality of air branch tubes for forming passageways correspondent to said plurality of first air branch tubes via said plurality of first automatic opening/closing parts; and
   a plurality of air spray nozzles respectively connected to said plurality of second air branch tubes, and installed to said plural positions of said interior of said vehicle.

5. The air conditioner for forming an air curtain as claimed in claim 4, wherein said plurality of air spray nozzles are respectively arranged over the doors in said interior of said vehicle, between a driver's seat and an assistant driver's seat, between said driver's seat and a rear seat, and between said assistant driver's seat and rear seat.

6. The air conditioner for forming an air curtain as claimed in claim 4, wherein said plurality of air spray nozzles respectively is an elongated hollow body having an opening lengthwisely opened in one side, an air suction hole connected to one of said plurality of second air branch tubes in the central upper portion, and a neck portion lengthwisely provided on a prescribed portion thereof.

7. The air conditioner for forming an air curtain as claimed in claim 4, wherein said air suction nozzle part comprises:
   a plurality of air suction nozzles arranged to said interior of said vehicle to be opposite to said plurality of air spray nozzles; and
   a plurality of third air branch tubes respectively connected to said plurality of air suction nozzles for discharging said air drawn from said plurality of air suction nozzles.

8. The air conditioner for forming an air curtain as claimed in claim 7, wherein said plurality of air suction nozzles respectively includes a plurality of air suction holes in the upper portion, and an exhaust hole connected to one of said plurality of air branch tubes in the bottom center portion.

9. The air conditioner for forming an air curtain as claimed in claim 7, wherein said air exhausting part comprises:
   a discharge duct having a chamber with a side wall including a plurality of air branch holes on one end thereof, and a first exhaust opening for externally discharging said air and a second exhaust opening connected to a circuitous tube for recirculating said air to said air feeding part on the other end thereof;
   first, second and third dampers for selectively opening and closing said first and second exhaust openings;
   a third blower installed between said first and second exhaust openings and said chamber for discharging said air; and
   a plurality of fourth air branch tubes respectively connected to said plurality of second automatic opening/closing parts, and then said plurality of air branch holes of said discharge duct for forming a plurality of passageways.

10. An air conditioner for forming an air curtain comprising:
   an air conditioning part for drawing in outside air, cooling or heating the drawn air, and discharging the cooled or heated air, said air conditioning part comprising:
      an air conditioning duct having an air inlet on one end thereof and a plurality of air outlets on the other end thereof for admitting the air from outside, and discharging said admitted air to said air curtain forming apparatus,
      a first blower arranged to be opposite to said air inlet for drawing in said air from outside,
      an evaporator arranged on the rear of said first blower for cooling said admitted air during performing said cooling operation,
      a heater arranged on the rear of said evaporator for heating said admitted air during performing said heating operation, and
      a plurality of dampers for controlling the air flow in said air conditioning duct, and regulating the amount of said air discharged from said air conditioning duct;
   an air curtain forming apparatus for admitting said cooled or heated air discharged from said conditioning part, and spraying said coded or heated air at plural positions or a specific position of an interior of a vehicle to form said air curtain for performing the cooling or heating operation,
   said air curtain forming apparatus comprising:
      an air feeding part for drawing in said cooled or heated air from said air conditioning part or outside, and discharging said drawn air to a plurality of passageways,
      said air feeding part having
         an air-supply duct having a first inlet for admitting said air from outside in one end, second and third inlets for admitting said air cooled and heated air in one side, a fourth inlet for drawing in said air from said air exhausting part in the other side, and a chamber at the other end thereof, said chamber having a plurality of air branch holes in a side wall thereof,
         first, second and third dampers for respectively opening and closing said first, second and third inlets,
         a second blower installed between said first, second, third and fourth inlets and said chamber for drawing in said air, and
         a plurality of first air branch holes of said air-supply duct,
      an air spray nozzle part for admitting said air discharged from said plurality of passageways via a corresponding plurality of passageways, and spraying said admitted air at said plural positions of said interior of said vehicle to form said air curtain,
      an air suction nozzle part arranged in said interior of said vehicle opposite to said air spray nozzle part, and drawing in said air sprayed from said air spray nozzle part in said air curtain to discharge said air to a plurality of passageways,
      an air exhausting part for admitting said air discharged from said plurality of passageways of said air suction nozzle part, and recirculating said admitted air to said air feeding part or externally discharging said admitted air,
      a plurality of first automatic opening/closing parts installed between said plurality of passageways of said air feeding part and said plurality of passageways of said air spray nozzle part for opening or closing the air flow from said air feeding part to said air spray nozzle part for each passageway, and a plurality of second automatic opening/closing parts installed between said plurality of passageways of said air suction nozzle part and said plurality of passageways of said air exhausting part for opening or closing the air flow from said air suction nozzle part to said air exhausting part for each passageway;

a temperature/recognition sensing part for monitoring a temperature of said interior of said vehicle to output a temperature information signal, and monitoring the position of a passenger in said interior of said vehicle to output a passenger recognition signal;

a mode selecting part for controlling the discharge of said cooled or heated air of said air conditioning part, and controlling the spraying position of said air curtain of said air curtain forming apparatus;

a temperature/operation controlling part for outputting an air-amount regulation signal for regulating the amount of the air admitted to said interior of said vehicle, a cooling/heating selection signal for selecting the cooling or heating of said air drown to said air conditioning part, and a preset temperature signal for setting a cooling temperature or heating temperature of said drawn air; and an air-conditioner controlling part for receiving said temperature information signal and passenger recognition signal of said temperature/recognition sensing part, said mode control signal of said mode selecting part, said air-amount regulation signal, cooling/heating selection signal and preset temperature signal of said temperature/operation controlling part to control said air conditioning part and air curtain forming apparatus.

11. The air conditioner for forming an air curtain as claimed in claim 10, wherein said air conditioning duct includes a cool-air outlet between said evaporator and heater, and a warm-air outlet and a plurality of air outlets on the rear of said heater, said cool-air outlet and warm-air outlet respectively being connected to a cool-air intake conduit and a warm-air intake conduit connected to said air curtain forming apparatus, said plurality of air outlets being connected to said interior of said vehicle.

12. The air conditioner for forming an air curtain as claimed in claim 10, wherein said air spray nozzle part comprises:

a plurality of air branch tubes for forming passageways correspondent to said plurality of first air branch tubes via said plurality of first automatic opening/closing parts; and a plurality of air spray nozzles respectively connected to said plurality of second air branch tubes, and installed to said plural positions of said interior of said vehicle.

13. The air conditioner for forming an air curtain as claimed in claim 12, wherein said plurality of air spray nozzles are respectively arranged over the doors in said interior of said vehicle, between a driver's seat and an assistant driver's seat, between said driver's seat and a rear seat, and between said assistant driver's seat and rear seat.

14. The air conditioner for forming an air curtain as claimed in claim 12, wherein said plurality of air spray nozzles respectively is an elongated hollow body having an opening lenghwisely opened in one side, an air suction hole connected to one of said plurality of second air branch tubes in the central upper portion, and a neck portion lengthwisely provided on a prescribed portion thereof.

15. The air conditioner for forming an air curtain as claimed in claim 12, wherein said air suction nozzle part comprises:

a plurality of air suction nozzles arranged to said interior of said vehicle to be opposite to said plurality of air spray nozzles; and a plurality of third air branch tubes respectively connected to said plurality of air suction nozzles for discharging said air drawn from said plurality of air suction nozzles.

16. The air conditioner for forming an air curtain as claimed in claim 15, wherein said plurality of air suction nozzles respectively includes a plurality of air suction holes in the upper portion, and an exhaust hole connected to one of said plurality of air branch tubes in the bottom center portion.

17. The air conditioner for forming an air curtain as claimed in claim 15, wherein said air exhausting part comprises;

a discharge duct having a chamber with a side wall including a plurality of air branch holes on one end thereof, and a first exhaust opening for externally discharging said air and a second exhaust opening connected to a circuitous tube for recirculating said air to said air feeding part on the other end thereof;

first, second and third dampers for selectively opening and closing said first and second exhaust openings;

a third blower installed between said first and second exhaust openings and said chamber for discharging said air; and a plurality of fourth air branch tubes respectively connected to said plurality of second automatic opening/closing parts, and then said plurality of air branch holes of said discharge duct for forming a plurality of passageways.

* * * * *